United States Patent Office 3,662,039
Patented May 9, 1972

3,662,039
PROCESS FOR THE PRODUCTION OF HALOGENATED METHYLENEDIPHOSPHONATES
Denzel Allan Nicholson, Cincinnati, Ohio, assignor to The Procter & Gamble Company, Cincinnati, Ohio
No Drawing. Filed Oct. 25, 1968, Ser. No. 770,860
Int. Cl. C07c 69/38; C07f 9/40; C10m 1/46
U.S. Cl. 260—986
9 Claims

ABSTRACT OF THE DISCLOSURE

Halogenated methylenediphosphonate esters (7 to 22 carbon atoms in each ester group), halogenated malonate esters (4–22 carbon atoms in each ester group), and halogenated phosphonoacetate esters (8 to 22 carbon atoms in each ester group) are disclosed, wherein the halogen is present on the bridging carbon atom between the ester moieties. The compounds have utility as extreme pressure and anti-wear additives for lubricant compositions. Also disclosed is a process for preparing said halogenated esters by reacting the corresponding unhalogenated esters with hypohalite ions in an aqueous reaction medium containing a water-miscible organic solvent.

BACKGROUND OF THE INVENTION (1) Field of the invention

This invention relates to a process for preparing certain mono- and dihalogenated methylenediphosphonate esters, malonate esters and phosphonoacetate esters which contain one or two chlorine, bromine or iodine atoms attached to a methylene group which connects two moieties selected from the group consisting of phosphonate ester and carboxylate ester moieties and to certain of these dihalogenated methylenediphosphonate esters, malonate esters and phosphonoacetate esters which are useful as extreme pressure additives and anti-wear additives in lubricant compositions.

(2) Prior art

The copending U.S. application of Quimby et al. Ser. No. 587,417, filed Oct. 18, 1966, and now abandoned presents a practical process for the production of halogenated tetraalkyl methylenediphosphonates wherein the alkyl groups contain from about 3 to about 8 carbon atoms. The copending U.S. application of Curry, Ser. No. 717,999, filed Apr. 1, 1968, and now abandoned presents a practical process for the production of halogenated tetraalkyl methylenediphosphonates wherein the alkyl radical contains from 1 to 2 carbon atoms. Neither of the processes disclosed in the above applications is suitable for preparing halogenated methylenediphosphonate esters, phosphonoacetate esters or malonate esters where the alcohol portion of the esters contains at least 7 carbon atoms in the case of the methylenediphosphonates, at least 4 carbon atoms in the case of the malonates and at least 8 carbon atoms in the case of the phosphonoacetates. These relatively long chain alkyl and aryl esters are too insoluble in aqueous reaction media to permit the halogenation reaction to proceed.

THE INVENTION

This invention relates to the process for preparing halogenated methylenediphosphonate esters, malonate esters and phosphonoacetate esters which are useful as extreme pressure additives in lubricant compositions and as anti-wear additives in lubricant compositions comprising the steps of reacting a compound selected from the group consisting of: (1) methylenediphosphonates having the formula $R_2PO_3CH_2PO_3R_2$ wherein each R is selected from the group consisting of alkyl, aryl, alkaryl, aralkyl, haloalkyl, haloaryl, haloalkaryl, haloaralkyl, alkenyl, haloalkenyl, and nitroaryl radicals containing from 7 to about 22 carbon atoms; (2) malonates having the formula $R'OOCCH_2COOR'$ wherein each R' is selected from the group consisting of alkyl, alkenyl, aryl, aralkyl, alkaryl, haloalkyl, haloalkenyl, haloaryl, haloalkary, haloaralkyl, and nitroaryl radicals containing from 4 to about 22 carbon atoms; and (3) phosphonoacetates having the formula $R_2{}^2PO_3CH_2COOR^2$ wherein each $R_2$ is selected from the group consisting of alkyl, alkenyl, aryl, alkaryl, aralkyl, haloalkyl, haloalkenyl, haloaryl, haloalkaryl, haloaralkyl and nitroaryl radicals containing from 8 to about 22 carbon atoms with a hypohalite ion selected from the group consisting of $OCl^-$, $OBr^-$ and $OI^-$, the molar proportions of the reactant being selected so that there are from about 0.75 to about 6 moles of said hypohalite ion for each mole of said methylenediphosphonates, malonates or phosphonoacetates, in a two-phase reaction mixture comprised of (A) an aqueous solution containing essentially no added electrolyte and from 1% to about 50% by weight of a water miscible organic solvent, and (B) an organic phase comprising said methylenediphosphonates, malonates or phosphonoacetates, and, if desired, a water immiscible organic solvent, the temperature of the reaction being in the range of from 0° C. to 75° C. the pH of the aqueous solution being greater than about 7 and the reaction time being from about 1 minute to about 2.0 hours.

DETAILED DISCLOSURE

The present invention is valuable in that the reactant and the reaction conditions mentioned above can be adjusted as shown hereinafter to produce unexpectedly high yields of the mono- and dihalo derivatives of methylenediphosphonates, malonates and phosphonoacetates containing relatively big hydrocarbyl groups.

The reaction system is a fairly complex one, but by adhering to the conditions set forth above and more fully explained in the following discussion, high yields of any of the desired mono- and dihalogenated methylenediphosphonate esters, mono- and dihalogenated malonate esters and mono- and dihalogenated phosphonoacetate esters can be obtained.

The embodiment of this invention according to which a monohalo compound is prepared is illustrated by the following equations:

(I) 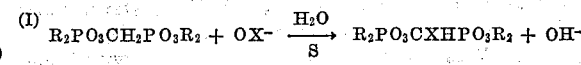

(II) 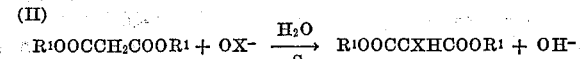

(III) 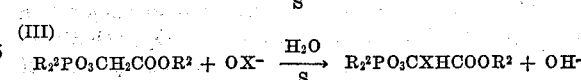

In the above equation $OX^-$ represents a hypohalite ion with X being a halogen selected from the group consisting of chlorine, bromine and iodine atoms; S is an inert, water-miscible organic solvent; R is selected from the group consisting of alkyl, aryl, alkaryl, aralkyl, haloalkyl, haloaryl, haloalkaryl, haloaralkyl, akenyl, haloalkenyl, and nitroaryl radicals containing from 7 to about 22 carbon atoms; $R^1$ is selected from the group consisting of alkyl, alkenyl, aralkyl, aryl, aralkyl, haloalkyl, haloalkenyl, haloaryl, haloakaryl, haloaralkyl and nitroaryl radicals containing from 4 to about 22 carbon atoms; and $R^2$ is selected from the group consisting of alkyl, alkenyl, aryl, alkaryl, aralkyl, haloalkyl, haloalkenyl, haloaryl, haloalkaryl, haloaralkyl and nitroaryl radicals containing from 8 to about 22 carbon atoms.

For purposes of understanding the present invention the hypohalite reactant is depicted simply as OX⁻, rather than as an inorganic hypohalite compound. It is to be understood that the essential reaction moiety is the hypohalite ion. It can either be introduced as an inorganic hypohalite such as NaOBr, NaOCl, NaOI or other equivalent alkali metal or alkaline earth metal form. Alternatively, the hypohalite ion can be generated in situ by means described below.

It has been discovered that surprisingly high yields of monohalogenated product can be obtained using from about 0.75 to about 1.1 moles of hypohalite to 1 mole of methylenediphosphonate, malonate, or phosphonoacetate. It is preferred for maximum yields that from 0.95 to about 1.1 moles of hypohalite ion to 1 mole of either methylenediphosphonate, malonate or phosphonoacetate be employed. It is important that no more than about 1.1 moles of hypohalite per mole of methylenediphosphonate, malonate or phosphonoacetate be present in the above reaction. In order to prepare high yields of a monohalogenated compound a larger portion of hypohalite ions tends to carry the reaction on to form the dihalo methylenediphosphonates, malonates or phosphonoacetates as explained below. The reactions of Equations I, II, and III can be terminated as discussed hereinafter, producing surprisingly high yields of monohalomethylenediphosphonates, malonates, or phosphonoacetates.

According to a further embodiment of this invention, the above reaction can be allowed to continue producing the corresponding dihalo methylenediphosphonates, malonates or phosphonoacetates. In this embodiment of the invention, the hypohalite ion reacts with the monohalo reaction product of Equations I, II and III to produce the corresponding dihalo methylenediphosphonates, malonates or phosphonoacetates. To provide sufficient hypohalite ion to form dihalo ester compounds a large excess of hypohalite ion can be used. It has been discovered that the highest yield of dihalo methylenediphosphonates, malonates or phosphonoacetates is obtained by using from about 2 to about 6 moles of hypohalite ion per 1 mole of methylenediphosphonate, malonate or phosphonoacetate. It is preferred that from 2.05 to about 2.1 moles of hypohalite ion be used per 1 mole of methylenediphosphonate, malonate or phosphonoacetate in the foregoing reactions to favor formation of the dihalo methylene diphosphonates, malonates, or phosphonoacetates.

The dihalogenation embodiment of the present inventions I, II and III or from any other suitable reaction. wherein all terms are as defined in Equations I, II and III. Equation IV can be considered in conjunction with Equation I above in which the $R_2PO_3CXHPO_3R_2$ starting material is thought of as the reaction product of Equation I; Equation V can be considered in conjunction with Equation II above in which the $R^1OOCCXHCOOR^1$ starting material is thought of as the reaction product of Equation II; and Equation VI can be considered in conjunction with Equation III above in which the $R_2{}^2PO_3CXHCOOR^2$ starting material is thought of as the reaction product of Equation III.

(IV)
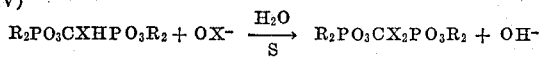

(V)
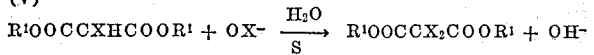

(VI)
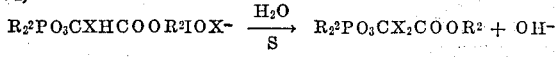

The preparation of dihalo esters can also proceed according to Equations IV, V and VI by beginning with monohalo methylenediphosphonates, malonates, or phosphonoacetates obtained from any source, i.e., from Equations I, II and III or from any other suitable recation. In this latter event highest yields of dihalo methylenediphosphonates, malonates or phosphonoacetates are obtained from using from about 1 to about 3 moles of hypohalite ion per 1 mole of monohalo methylenediphosphonate, malonate or phosphonoacetate and preferably from about 1.0 to about 1.1 moles of hypohalite ion per 1 mole of monohalo methylene diphosphonate, malonate or phosphonoacetate in the foregoing reactions IV–VI. It will be understood that with this approach it is possible for the two X's to be different.

The water miscible organic solvents of this invention include: alcohols containing from 1 to 3 hydroxy groups and from 1 to 6 carbon atoms such as methanol, ethanol, propanol, isopropanol, butanol, isobutanol, glycerine, ethylene glycol, propylene glycol and the like; ethers (including cyclic ethers) containing from 2 to about 8 carbon atoms such as ethylene glycol diethyl ether, butyl cellosolve, tetrahydrofuran, 1,4-dioxane, ethylene glycol dimethyl ether, propasol B, and the like; and ketones containing from 3 to about 5 carbon atoms including acetone, propyl methyl ketone, methyl ethyl ketone and the like.

It is preferred to keep electrolytes out of the reaction mixture since the electrolyte tends to keep the very water-insoluble methylenediphosphonate, malonate and phosphonoacetate reactants from dissolving sufficiently in the aqueous reaction mixture to permit the halogenation of these reactants.

The reactions set forth in Equations I–VI must be conducted above a pH of 7 at a temperature of from about 0° C. to about 75° C. These reactions take from about 1 minute to about 2 hours, depending upon the rate of addition of reactant, the temperature and general reaction conditions. In the preferred embodiment of the present invention the hypohalite is added slowly to a stirred mixture of the aqueous phase which contains the water-miscible solvent and the insoluble methylenediphosphonate, malonate or phosphonoacetate reactant. Vigorous stirring breaks the organic phase into tiny discrete globules intermixed with the aqueous phase. This agitation of the mixture is continued while the hypohalite is added to the reaction mixture.

It is important in directing the process of the present invention toward the monohalo product (Equations I, II and III) that the hypohalite be added to the methylenediphosphonate, malonate, or phosphonoacetate in order to minimize any excessive hypohalite present during the reaction. While the foregoing represents the preferred method of adding reactants in the process of the present invention, the hypohalite can be generated in the aqueous phase subsequent to the addition of the methylenediphosphonate, malonate or phosphonoacetate, or the methylenediphosphonate, malonate or phosphonoacetate can be added rapidly to the hypohalite. The reactant hypohalite ion can be added directly to an aqueous solution or can be generated in situ such as for example by repeated additions of small amounts of the desired halogen such as liquid bromine, chlorine gas or iodine as a solid or solution. Suitable hypohalites which can be added directly include all alkali metal and alkaline earth hypochlorites, hypobromites, hypoiodites. Examples of suitable hypohalite compounds include $Ca(OCl_2)$; $Ca(OBr)_2$, KOCl, KOBr, NaOCl, and NaOBr. It is preferred that the hypohalite ions be generated in situ for reasons stated hereinafter.

Generally, the solubility of the methylenediphosphonate, malonate and/or phosphonoacetate in the aqueous hypohalite solution can be substantially controlled, i.e., increased or decreased, by increasing or decreasing the organic water-miscible solvent concentration, respectively. The greater the solvent concentration in the aqueous solution, the higher the solubility of the methylenediphosphonate, malonate and phosphonoacetate reactants in the aqueous solution. The reverse is also true, that is, the lower the water-miscible solvent concentration the lower the solubility of these reactants. The solubility of the methylenediphosphonates, malonates and/or phosphonoacetates in the aqueous reaction solution can also be increased or decreased by increasing or decreasing the temperature, respectively.

Generally, whether the reaction product is the monohalo or dihalo derivative of the methylenediphosphonates, malonates or diphosphonoacetates is controlled by the proportion of the hypohalite reactant employed. If the desired end product is the monohalogenated derivative, from about 0.75 to about 1.1 moles of hypohalite ion per 1 mole of methylenediphosphonate or phosphonoacetate, should be used. For maximum yields of the monohalide it is preferred that from about 0.95 to about 1.1 moles of hypohalite ion per mole of methylenediphosphonate, malonate or phosphonoacetate be employed. Amounts of hypohalite greater than about 1.1 moles per mole of methylenediphosphonate, malonate or phosphonoacetate tend to favor the formation of increasing amounts of dihalogenated product.

Recovery of the halogenated methylenediphosphonate, noacetate reactant at 75° C., the alkenyl esters can reaction mixture can be performed by extraction with a water-immiscible, organic solvent followed by conventional decanting methods, and either column chromatography, selective extraction, distillation or fractional crystallization.

At extreme conditions, e.g., 6 moles of hypohalite per mole of methylenediphosphonate, malonate, or phosphonoacetate reactant and 75° C., the alkenyl esters can react further with the hypohalite to form halohydrins. Therefore, in general, these extreme conditions should be avoided when alkenyl esters are used.

In practicing each of the foregoing embodiments of this invention care must be taken that the reaction temperatures are not so high that the hypohalite ion ($OX^{-1}$) is converted to the halate ion ($O_3X^{-1}$) creating a deficiency of hypohalite ion in the reaction mixture. For example, temperatures up to about 50° C. are usually satisfactory for the avoidance of hypochlorite conversion, but are only marginally satisfactory for hypobromite conversion avoidance. However, by generating the hypohalite in situ the reactions can be conducted at substantially higher temperatures, i.e., over 80° C., as the hypohalite ion reacts with the methylenediphosphonate, malonate or phosphonoacetate before there is time for it to disproportionate to form halate ion.

The temperature must not be so high that it reaches a point at which undesirable ester saponification becomes significant. The temperature at which saponification occurs is governed by the pH of the system that is being used, higher pH favoring more saponification. Ester saponification to a significantly detrimental degree will occur above about 75° C. when the pH of the system is near neutrality, i.e., from about pH 7 to about pH 9. However, at highly basic pH's saponification will occur to a detrimental degree at lower temperatures.

Care must be taken to avoid excessive formation of hypohalous acid in the reaction system. The aqueous reaction medium must be kept basic enough to sustain the desired hypohalite ion. If the pH of the reaction system drops below about 7 the equilibrium $$HOX \rightleftharpoons OX^- + H^+$$

will shift to the left, causing the hypohalite ion to disappear. Consequently, the pH of the reaction system must be kept above about 7 in the case of chlorine addition, and should be above about a pH of 8 for bromine addition and above a pH of 10 for iodine addition. The reaction for each halogen can be conducted with a pH as high as about 14 and it is preferable that the pH of the reaction solution be above about 11.

The tetraalkyl methylenediphosphonates used as starting materials in this invention can be prepared by reacting dibromomethane with a trialkyl phosphite in accordance with the following equation:

$$2(RO)_3P + CH_2Br_2 \rightarrow CH_2(PO_3R_2)_2 + 2RBr$$

wherein R is an alkyl radical as set forth hereinbefore. The trialkyl phosphite in this reaction can be derived from a primary alcohol and phosphorus trichloride. The dibromomethane is a high temperature reaction product of methane and bromine. A more detailed discussion of the foregoing appears in U.S. Pat. 3,251,907 of Clarence H. Roy, issued May 17, 1966. Trialkyl phosphonoacetates can be prepared as follows:

$$P(OR^2)_3 + ClCH_2COOR^2 \rightarrow R_2^2PO_3CH_2COOR^2 + R^2Cl$$

or they can be purchased commercially. Malonate esters are available commercially.

The compounds of this invention are selected from the group consisting of:

(a) methylenediphosphonates having the formula:

$$R_2PO_3CX_2PO_3R_2$$

wherein each R is selected from the group consisting of alkyl, aryl, alkaryl, aralkyl, haloalkyl, haloaryl, haloalkaryl, haloaralkyl, alkenyl, haloalkenyl, and nitroaryl radicals containing from 9 to about 22 carbon atoms, one X is selected from the group consisting of chlorine, bromine and iodine atoms and the other X is selected from the group consisting of chlorine, bromine, iodine and hydrogen atoms;

(b) malonates having the formula:

$$R^1OOCCX_2COOR^1$$

wherein each $R^1$ is selected from the group consisting of alkyl, alkenyl, aralkyl, aryl, alkaryl, haloalkyl, haloalkenyl, haloaryl, haloalkaryl, haloaralkyl and nitroaryl radicals containing from 4 to about 22 carbon atoms, one X is selected from the group consisting of chlorine, bromine, and iodine atoms, and the other X is selected from the group consisting of chlorine, bromine, iodine and hydrogen atoms; and (c) phosphonoacetates having the formula $$R_2^2PO_3CX_2COOR^2$$

wherein each $R^2$ is selected from the group consisting of alkyl, alkenyl, aryl, alkaryl, aralkyl, haloalkyl, haloalkenyl, haloaryl, haloalkaryl, haloaralkyl and nitroaryl radicals containing from 8 to about 22 carbon atoms, one X is selected from the group consisting of chlorine, bromine and iodine atoms and the other X is selected from the group consisting of chlorine, bromine, iodine and hydrogen atoms.

These compounds are all extreme pressure additives when used at about the 5% level in an SAE 20 mineral oil. All of these compounds which contain alkyl groups having seven or more carbon atoms are also antiwear additives for lubricants when used as set forth hereinbefore. The use of the additives in lubricant compositions is more fully discussed in the copending application of Robert Earl Wann, Denzel Allen Nicholson and Ted Joe Logan, Ser. No. 762,966, filed Sept. 26, 1968, entitled Lubricant Composition now U.S. Pat. No. 3,579,449. This application is incorporated herein by reference.

EXAMPLE I

Preparation of tetraheptyl dichloromethylenediphosphonate

A 1 mole batch of tetraheptyl dichloromethylenediphosphonate is prepared by the following reaction:

2 moles of NaOCl (2840 cc. of a commercially available product of 5.25% NaOCl in $H_2O$) are placed in a 3 liter flask and cooled to 10° C. One mole (568 grams) of tetraheptyl methylenediphosphonate is then added rapidly. One hundred cc. of methanol are added to increase solubility of the tetraheptyl methylenediphosphonate in the $H_2O$. After exothermic activity has ceased, about 15 minutes, the solution is extracted with CHCl₃ three times. The combined CHCl₃ layers are dried over anhydrous sodium sulfate for fifteen minutes, then filtered and evaporated down to the oily product. This product can be further purified by heating to ~100° C. in a 50μ pressure system. This yields a substantially pure product, tetraheptyl dichloromethylenediphosphonate, in 80%–95% yield.

EXAMPLE II

Preparation of tetrakis(decyl)dibromo-methylenediphosphonate

A one mole batch of tetrakis(decyl))dibromomethylene diphosphonate is prepared by a fairly simple two step reaction.

Step #1: A three liter reaction flask is charged with 1000 cc. of a water solution of 4 mols (160 grams) of NaOH and this solution is cooled to 0°–5° C. Two moles (320.0 grams) of Br₂ are then added rapidly, with careful temperature control, to produce NaOBr along with NaBr and H₂O in equimolar amounts which have no effect on the second step of the reaction. The reaction is now ready to proceed with step #2.

Step #2: One mole (736.0 grams) of tetrakis(decyl) methylenediphosphonate is then added rapidly with careful attention to temperature changes. When all the tetrakis(decyl) methylenediphosphonate has been added and the reaction shows no sign of any exothermic activity or is very slowly exothermic, 100 cc. of methanol are added to increase solubility of the tetrakis(decyl) methylenediphosphonate in the H₂O containing the NaOBr. The temperature is controlled carefully at this point (5°–10° C.). The reaction mixture is stirred until no more exothermic activity is evident and the color of the solution has gone from a reddish-brown (the color of the mixture after step #1) to a light yellow or white color. At this point the H₂O layer is extracted three times with CCl₄. The combined CCl₄ layers are dried over anhydrous sodium sulfate for fifteen minutes, then filtered and the CCl₄ evaporated off, leaving a clear, colorless oil which is further purified by heating to ~100° C. in a 50μ pressure system. This yields a substantially pure product, tetrakis(decyl) dibromomethylenediphosphonate, in a 75–90% yield.

EXAMPLE III

Preparation of tetrabehenyl diiodomethylenediphosphonate

A 1 mole batch of tetrabehenyl diiodomethylenediphosphonate ester can be prepared by the following reaction:

Two moles (506 grams) of I₂ are placed in a 3 liter flask along with 4 moles of NaOH and 2 moles (332.0 grams) KI in 1 liter H₂O and cooled to 15° C. 1 mole (1411 grams) of tetrabehenyl methylenediphosphonate is then added rapidly. Two hundred cc. of methanol are added to increase the solubility of the tetrabehenyl methylenediphosphonate in the H₂O. More methanol is used, if necessary, to cause reaction. After the exothermic activity has ceased, the solution is extracted with CHCl₃ three times. The combined CHCl₃ layers are dried over anhydrous soduim sulfate for fifteen minutes, then filtered and evaporated down. The product is dark in color. After all CHCl₃ is removed by mild heating and exposure to a 50μ vacuum the product, tetrabehenyl diiodomethylenediphosphonate, is found to be substantially pure in 70%–90% yields.

EXAMPLE IV

Preparation of dipentyl dichloromalonate

A 1 mole batch of dipentyl dichloromalonate is prepared by the following reaction:

Two moles of NaOCl (2840 cc. of a commercially available product at 5.25% NaOCl in H₂O) are placed in a 3 liter flask and cooled to 0° C. (500 cc. CCl₄ added).

One mole (244.0 grams) of dipentyl malonate is then added rapidly in methanol solution. The solutions are stirred vigorously for 15 minutes at which time they are separated and the CCl₄ layer dried over anhydrous sodium sulfate, filtered, and evaporated down. A 50% yield of dipentyl dibromomalonate is obtained fairly easily; however, if methanol is used in the pot during or immediately following addition of the dipentyl malonate, yield is boosted to >90%.

EXAMPLE V

Preparation of bis(dodecyl) dibromomalonate

A 1 mole batch of bis(dodecyl) dibromomalonate is prepared by the following reaction:

Four moles of NaOH are dissolved in 1 liter of H₂O in a 3 liter flask and the solution is cooled to 0° C. One mole of bis(dodecyl) malonate is added carefully and 100 cc. of methanol are added to insure solubility. The two phase system is then stirred vigorously as 2 moles of Br₂ are dripped in at a reasonably fast rate (as fast as will allow temperature control at 0°–5° C.). After all the bromine has been added, the solution is stirred for ten minutes more, then the two layers are separated. After extraction 3 times with CCl₄, the CCl₄ layer is dried over anhydrous sodium sulfate, then filtered and evaporated down. The product is further purified by heating in a vacuum of ~100μ. This yields a substantially pure material, bis(dodecyl) dibromomalonate, in 80–90% yields.

EXAMPLE VI

Preparation of bis(stearyl) diiodomalonate

A 1 mole batch of bis(stearyl) diiodomalonate is prepared by the following 2 step reaction.

Step #1: Two moles of bis(stearyl) malonate, in CCl₄ solution, is dripped into the reaction mixture. Three hundred cc. of ethanol are added to enhance solubility. (More ethanol is added if needed to start reaction.) The solutions are stirred together for 15 minutes at 0° C. At this time they are separated and the CCl₄ layer dried over anhydrous sodium sulfate, then filtered, and evaporated down. The product, bis(stearyl) diiodomalonate, is a substantially pure material in 70–90% yield.

EXAMPLE VII

Preparation of trioctyl dichlorophosphonoacetate

A 1 mole batch of trioctyl dichlorophosphonoacetate is prepared by bubbling 2 moles Cl₂ (142.0 grams) into a flask containing 1 mole (476 grams) of trioctyl phosphonoacetate in CCl₄ solution, and 4 moles NaOH (160.0 grams) in H₂O solution at 0° C. After the Cl₂ has been added 100 cc. acetone are added to increase solubility of the trioctyl phosphonoacetate in the hypochlorite-containing H₂O layer. Some exothermic activity is noticed and the reaction temperature is kept at 5° C. by external cooling. After 15 minutes of vigorous stirring, the layers are separated. The CCl₄ layer is dried over anhydrous sodium sulfate for several minutes, then filtered and the solvent removed by evaporation. The product, trioctyl dichlorophosphonoacetate, is a substantially pure product in 90–99% yields.

EXAMPLE VIII

Preparation of tris(pentadecyl) dibromophosphonoacetate

A 1 mole batch of tris(pentadecyl) dibromophosphonoacetate is prepared by dripping 2 moles Br₂ (320.0 grams) into a flask containing 1 mole (775.5 grams) of tris(pentadecyl) dibromophosphonoacetate in CCl₄ solution, and 4 moles NaOH (166.0 grams) in H₂O solution at 0° C. After the Br₂ has been added 100 cc. tetrahydrofuran are added to increase solubility of the tris(pentadecyl) phosphonoacetate in the hypobromite-containing H₂O layer. After the exothermic activity has ceased (temperature is held from 0°–5° C.), about 15 minutes, the layers are separated. The CCl₄ layer is dried over anhydrous sodium sulfate for several minutes, then filtered and the solvent removed by evaporation. The product is a substantially pure material, tris(pentadecyl) dibromophosphonoacetate, in 80–90% yields.

EXAMPLE IX

Preparation of tris(eicosyl) diiodophosphonoacetate

A 1 mole batch of tris(eicosyl) diiodophosphonoacetate is prepared by dripping two moles $I_2$ (506.0 grams) in CCl₄ solution into a flask containing 1 mole (980.0 grams) of tris(eicosyl) phosphonoacetate in CCl₄ solution, and 4 moles (160.0 grams) NaOH in $H_2O$ solution at 0° C. After the $I_2$ has been added, 300 cc. ethanol are added to increase solubility of the tris(eicosyl) phosphonoacetate in the hypoiodite containing $H_2O$ layer. After the exothermic activity has ceased, during which time the temperature is held at 0° C. in an ice bath, the layers are separated and the CCl₄ layer dried over anhydrous sodium sulfate for 15 minutes, then filtered and the CCl₄ removed by evaporation. The product, tris(eicosyl) diiodophosphonoacetate, is a substantially pure material and is obtained in 70–90% yields.

EXAMPLE X

One mole of the material in column (A) is reacted with sufficient amounts of the material in column (B) to provide 2.1 moles of the hypohalite ion produced by the material in Column (B), using the procedure of Example III, to give the product in Column (C).

| (A) | (B) | (C) |
| --- | --- | --- |
| Tetra(2-ethylhexyl) methylenediphosphonate. | Ca(OBr)₂ | Tetra(2-ethylhexyl) dibromomethylenediphosphonate. |
| Tetra(dodecenyl) methylenediphosphonate. | KOI | Tetra(dodecenyl) diiodomethylenediphosphonate. |
| Tetranaphthyl methylenediphosphonate. | KOCl | Tetranaphthyl dichloromethylenediphosphonate. |
| Tetrabenzyl methylenediphosphonate. | KOBr | Tetrabenzyl dibromomethylenediphosphonate. |
| Tetra(octylphenyl) methylenediphosphonate. | Ba(OCl)₂ | Tetra(octylphenyl) dichloromethylenediphosphonate. |
| Tetra(dichlorostearyl) methylenediphosphonate. | Ca(OCl₂) | Tetra(dichlorostearyl) dichloromethylenediphosphonate. |
| Tetra(6, 9-difluorononadecenyl) methylenediphosphonate. | NaOCl | Tetra(6, 9-difluorononadecenyl) dichloromethylenediphosphonate. |
| Tetra(2-bromonaphthyl) methylenediphosphonate. | NaOBr | Tetra(2-bromonaphthyl) dibromomethylenediphosphonate. |
| Tetra(2, 4-diiodobenzyl) methylenediphosphonate. | NaOI | Tetra(2, 4-diiodobenzyl) diiodomethylenediphosphonate. |
| Tetra(2-chloroethylphenyl) methylenediphosphonate. | NaOCl | Tetra(2-chloroethylphenyl) dichloromethylenediphosphonate. |
| Tetra(4-nitronaphthyl) methylenediphosphonate. | Ca(OI)₂ | Tetra(4-notrinaphthyl) diiodomethylenediphosphonate. |
| Di(2-ethylhexyl) malonate. | KOBr | Di(2-ethylhexyl) dibromomalonate. |
| Do | KOI | Di(2-ethylhexyl) diiodomalonate. |
| Di(octadecenyl) malonate. | KOBr | Di(octadecenyl) dibromomalonate. |
| Dinaphthyl malonate. | NaOI | Dinaphthyl diiodomalonate. |
| Dibenzyl malonate. | NaOBr | Dibenzyl dibromomalonate. |
| Di(pentadecylphenyl) malonate. | Ca(OBr)₂ | Di(pentadecylphenyl) dibromomalonate. |
| Di(tetrachlorostearyl) malonate. | Ca(OCl)₂ | Di(tetrachlorostearyl) dichloromalonate. |
| Di(5-iodopentadecenyl) malonate. | KOI | Di(5-iodopentadecenyl) diiodomalonate. |
| Di(6-chloronaphthyl) malonate. | Ca(OI)₂ | Di(6-chloronaphthyl) diiodomalonate. |
| Di[6-(1, 3-dichlorophenyl)decyl]malonate. | NaOBr | Di[6-(1, 3-dichlorophenyl)decyl]dibromomalonate. |
| Di(2, 3-dibromodecylphenyl) malonate. | NaOBr | Di(2, 3-dibromodecylphenyl) dibromomalonate. |
| Di(4, 6-dinitronaphthyl) malonate. | NaOI | Di(4, 6-dinitronaphthyl) diiodomalonate. |
| Tri(2-ethylhexyl) phosphonoacetate. | NaOCl | Tri(2-ethylhexy) dichlorophoacetate. |
| Tri(octenyl) phosphonoacetate. | NaOI | Tri(octenyl) diiodophosphonoacetate. |
| Trinaphthyl phosphonoacetate. | KOBr | Trinaphthyl dibromophosphonoacetate. |
| Tribenzyl phosphonoacetate. | KOI | Tribenzyl diiodophosphonoacetate. |
| Tri(dodecylphenyl) phosphonoacetate. | Ca(OCl)₂ | Tri(dodecylphenyl) dichlorophosphonoacetate. |
| Tri(9, 10-diiodostearyl) phosphonoacetate. | NaOI | Tri(9, 10-diiodostearyl) diiodophosphonoacetate. |
| Tri(3-bromoeicosenyl) phosphonoacetate. | NaOCl | Tri(3-bromoeicosenyl) dichlorophosphonoacetate. |
| Tri(6-chloronaphthyl) phosphonoacetate | KOCl | Tri(6-chloronaphthyl) dichlorophosphonoacetate. |
| Tri(2-bromo-6-phenyldecyl) phosphonoacetate. | KOI | Tri(2-bromo-6-phenyldecyl) diiodophosphonoacetate. |
| Tri(2-chlorodecylphenyl) phosphonoacetate. | NaOCl | Tri(2-chlorodecylphenyl) dichlorophosphonoacetate. |
| Tri(4-nitronaphenyl) phosphonoacetate. | NaOBr | Tri(4-nitronaphthyl) dibromophosphonoacetate. |
| 2-ethylhexyl stearyl malonate. | NaOI | 2-ethylhexyl stearyl diiodomalonate. |

When, in the above Examples I–X, 1.05 moles of hypohalite ion per mole of methylenediphosphonate, malonate, or phosphonoacetate reactant are used instead of the indicated amounts, and the hypohalite is added last and dropwise to the reaction mixture which is being vigorously stirred, the products are the corresponding monobromo, monochloro and monoiodo methylenediphosphonates, malonates and phosphonoacetates.

In general, the dihalo methylenediphosphonates, malonates and phosphonoacetates are better extreme pressure additives than the monohalo methylenediphosphonates, malonates and phosphonoacetates. Also, in general, the diiodo substituted methylenediphosphonates and malonates are better than the dibromo substituted methylenediphosphonates and malonates which, in turn, are better than the dichloro substituted methylenediphosphonates and malonates as extreme pressure additives for lubricants. The dichloro, dibromo, and diiodo phosphonoacetates are more equivalent as extreme pressure additives for lubricants. With the exception of the malonates which contain alkyl groups having less than seven carbon atoms, all of the compounds of this invention are valuable in that they have antiwear properties as well as extreme pressure activity when used in lubricant compositions. Suitable lubricant compositions include those where 50% of any of the above specifically named compounds prepared in Examples I–X are used in an SAE 20 mineral oil.

Preferred compounds for extreme-pressure activity include the dibromo- and diiodo-malonates containing $R^1$ groups having from four to about seven carbon atoms. Dibromo and diiodo malonates containing R' groups having at least four carbon atoms are surprisingly less corrosive than dibromo and diiodo malonates containing R' groups having less than four carbon atoms.

When, in the above Examples I–X, the following water miscible organic solvents are substituted, either wholly or in part (e.g., a 1:1 ratio by weight) for the methanol, substantially equivalent results are obtained in that good yields of the desired products are obtained: ethanol, propanol, isopropanol, butanol, isobutanol, glycerine, ethylene glycol, propylene glycol, ethylene glycol diethyl ether, diethyene glycol n-butyl ether, ethylene glycol n-butyl ether, propylene glycol butoxy ether, tetrahydrofuran, 1,4-dioxane, ethylene glycol dimethyl ether, acetone, propyl methyl ketone and/or methyl ethyl ketone.

What is claimed is:

1. A process for preparing halogenated methylenediphosphonates comprising the step of reacting methylene diphosphonates having the formula $R_2PO_3CH_2PO_3R_2$ wherein each R is a radical containing from 7 to 22 carbon atoms and is selected from the group consisting of alkyl, unsubstituted aryl, alkaryl, aralkyl, haloalkyl, haloaryl, haloalkaryl, haloaralkyl, alkenyl, haloalkenyl, and nitroaryl radicals with a hypohalite ion selected from the group consisting of OCl⁻, OBr⁻, and OI⁻, the molar proportions of the reactants being selected so that there are from about 0.75 to about 6 moles of said hypohalite ion for each mole of said methylenediphosphonates in a two-phase reaction mixture comprised of (A) an aqueous solution containing essentially no added electrolyte and from 1% to about 50% by weight of a water miscible organic solvent, and (B) an organic phase comprising said methylenediphosphonates, the temperature of the reaction being in the range of from 0° C. to 75° C. the pH of the aqueous solution being greater than about 7 and the reaction time being from about 1 minute to about 2.0 hours.

2. The process of claim 1 wherein (a) the methylenediphosphonate and (b) the hypohalite ion are present in a molar ratio of from about 1:0.75 to about 1:1.1.

3. The process of claim 2 wherein the molar ratio is from about 1:0.95 to 1:1.1.

4. The process of claim 1 wherein (a) the methylenediphosphonate and (b) the hypohalite ion are present in a molar ratio of from about 1:2 to about 1:6.

5. The process of claim 4 wherein the molar ratio is from about 1:2.05 to about 1:2.1.

6. The process of claim 1 wherein each R is an alkyl group.

7. The process of claim 1 wherein the water miscible organic solvent is selected from the group consisting of (a) alcohols containing from 1 to 3 hydroxy groups and from 1 to 6 carbon atoms, (b) ethers containing from 2 to about 8 carbon atoms, and (c) ketones containing from 3 to about 5 carbon atoms.

8. The process of claim 1 wherein the water miscible solvent is selected from the group consisting of methanol, ethanol, propanol, isopropanol, butanol, isobutanol, glycerine, ethylene glycol, propylene glycol, ethylene glycol diethyl ether, diethylene glycol n-butyl ether, ethylene glycol n-butyl ether, propylene glycol butoxy ether, propylene glycol isobutoxy ether, dipropylene glycol butoxy ether, tetrahydrofuran, 1,4-dioxane, ethylene glycol dimethyl ether, acetone, propyl methyl ketone, and methyl ethyl ketone.

9. The process of claim 1 wherein the organic phase comprises said methylenediphosphonates and a water immiscible organic solvent.

References Cited

UNITED STATES PATENTS

| | | | |
|---|---|---|---|
| 3,299,123 | 1/1967 | Fitch et al. | 260—932 X |
| 3,422,021 | 1/1969 | Roy | 260—932 X |
| 3,471,552 | 10/1969 | Budnick | 260—932 X |

OTHER REFERENCES

Groggins, Unit Processes in Organic Synthesis, McGraw-Hill, New York, Fifth edition (1958), pp. 206 to 208 and 250.

Bunyan et al.: J. Chem. Soc. (1962), pp. 2953 to 2958.

JOSEPH REBOLD, Primary Examiner

R. L. RAYMOND, Assistant Examiner

U.S. Cl. X.R.

252—49.5, 49.8, 49.9, 51.5 A, 54.6; 260—932, 941, 479 S, 485 H

PO-1050
(5/69)

UNITED STATES PATENT OFFICE
CERTIFICATE OF CORRECTION

Patent No. 3,662,039                    Dated May 9, 1972

Inventor(s)    Denzel Allan Nicholson

It is certified that error appears in the above-identified patent and that said Letters Patent are hereby corrected as shown below:

Column 1, line 69, after "compositions" and before "comprising" insert --- ; ---.

Column 2, line 10, delete "$R_2$" and insert therefor --- $R^2$ ---.

Column 2, line 63, delete "akenyl" and insert therefor --- alkenyl ---.

Column 2, line 67, delete "haloakaryl" and insert therefor --- haloalkaryl ---.

Column 3, lines 47-48, delete "inventions I, II and III or from any other suitable reaction." and insert therefor --- invention is more fully illustrated in the following equations ---.

Column 4, line 2 delete "recation" and insert therefor --- reaction ---.

Column 5, line 23, delete "noacetate reactant at 75°C., the alkenyl esters can" and insert therefor --- malonate and phosphonoacetate products from the ---.

Column 9, line 47, delete "(2,4-diiobodenzyl) and insert therefor --- (2,4-diiodobenzyl)

Column 9, line 50, In Column C delete "(4-notrinaphthyl) and insert therefor --- (4-nitronaphthyl) ---.

Signed and sealed this 7th day of November 1972.

(SEAL)
Attest:

EDWARD M. FLETCHER, JR.
Attesting Officer

ROBERT GOTTSCHALK
Commissioner of Patents